United States Patent [19]

Cronin et al.

[11] 3,831,160
[45] Aug. 20, 1974

[54] VOLTAGE AND CURRENT MONITORING SYSTEM

[75] Inventors: Michael J. Cronin, Salem; George H. Vogt, Topsfield, both of Mass.

[73] Assignee: General Electric Company, Schenectady, N.Y.

[22] Filed: Oct. 1, 1973

[21] Appl. No.: 402,262

[52] U.S. Cl............... 340/256, 317/18 B, 324/51
[51] Int. Cl........................................ G08b 21/00
[58] Field of Search.............. 340/255, 256, 269; 317/18 B; 324/51

[56] References Cited
UNITED STATES PATENTS

| | | | |
|---|---|---|---|
| 1,996,063 | 4/1935 | Corkran | 340/269 |
| 2,755,435 | 7/1956 | Schiedel | 324/51 |
| 3,242,382 | 3/1966 | Rogers | 324/51 X |
| 3,320,480 | 5/1967 | Failor | 324/51 X |
| 3,407,336 | 10/1968 | Embree | 340/255 X |
| 3,483,470 | 12/1969 | Tsergas | 324/51 X |
| 3,593,123 | 7/1971 | Williamson et al. | 324/51 |
| 3,766,434 | 10/1973 | Sherman | 317/18 B |

*Primary Examiner*—David L. Trafton
*Attorney, Agent, or Firm*—John F. Ahern; James W. Mitchell

[57] ABSTRACT

A voltage and current monitoring system for use in detecting pulse and continuous voltages and currents on a rotating shaft. The system includes contacts for electrically grounding a shaft and means for monitoring current flow through a grounding contact and to provide an alarm if excessive current is present. Voltage monitoring circuits are also provided to ascertain whether the grounding contacts are operative and to provide an alarm is excessive voltage is present between the shaft and ground.

10 Claims, 2 Drawing Figures

PATENTED AUG 20 1974 3,831,160

VOLTAGE AND CURRENT MONITORING SYSTEM

BACKGROUND OF THE INVENTION

This invention relates to voltage and current monitoring systems and, more particularly, to a system for concurrent monitoring of voltage and current on a rotating shaft.

In some equipment, such as for example, a turbine generator arrangement, voltage differentials may build up on a rotating shaft which voltage differentials may cause large currents to flow in the shaft. These currents may damage the equipment by causing heating and resultant excessive wear of bearings supporting the shaft. The voltage differential between shaft and ground may build up to a value high enough to break down bearing oil films resulting in pitting of the bearings and early bearing failure.

In a turbine generator arrangement, there are three major sources of voltage between a shaft and ground. These sources are the electromagnetic loop voltage from one end of the generator to the other due to dissymmetrics in the generator magnetic paths, static charges resulting from droplets of water being thrown off turbine blades in wet stages, and a capacitive voltage due to a ripple on the DC field voltage.

Outboard bearings at one end of a generator are normally insulated to open circuit the electromagnetic loop voltage and thus eliminate a major source of shaft current. In order to further protect the shaft from voltage buildup and current flow from other sources, contacts have been provided to ride on the shaft and provide a harmless path for current flow from shaft to ground. The contacts will keep the shaft to ground voltage low, as long as the contacts function properly, by bleeding off current and causing the weak source voltage to decay.

BRIEF DESCRIPTION OF THE INVENTION

In accordance with the present invention, there is provided a means for monitoring the effectiveness of contacts in preventing voltage buildup on a shaft and there is further provided a means for determining if insulation used to open circuit the electromagnetic loop voltage is effective in preventing current flow through the outboard bearings. Moreover, the present invention provides a means for alerting personnel if either excessive shaft to ground voltage builds up or excessive current flows through a grounding contact.

Accordingly, it is an object of this invention to provide a means for monitoring voltage buildup on a rotating shaft.

It is another object of this invention to provide a means for monitoring current flow in a rotating shaft.

It is a further object of this invention to provide a means for alerting personnel of excessive voltage buildup or excessive current flow on a rotating shaft.

In carrying out the objects of this invention, in one form thereof, a turbine-generator arrangement including coupled shafts, a pair of contacts and a monitoring system therefor is shown. The contacts may comprise, for example, a pair of brushes in rubbing contact with the shaft. One of the brushes is connected to ground through a high impedance voltage monitor. The other brush is connected to ground through a low impedance shunt. A current monitoring circuit is connected across the shunt. Both the high impedance voltage monitor and the current monitor include circuitry to provide an alarm if preset voltage and current levels are exceeded. The voltage monitor also includes circuitry for providing a second alarm if a predetermined voltage is sustained in excess of a predetermined period of time. The input to the voltage monitor is tuned to provide linear attenuation over a wide range of frequencies.

BRIEF DESCRIPTION OF THE DRAWINGS

For a better understanding of the invention, reference may be had to the accompanying drawings in which.

DESCRIPTION OF THE PREFERRED EMBODIMENT

While it is contemplated that the voltage and current monitoring system of this invention may have other applications, it is particularly useful in connection with monitoring of voltage and current on a rotating shaft and is particularly described below in conjunction with such use. Moreover, it is described as employed in a turbine generator arrangement utilizing contacts for dissipation of charge buildup on the turbine-generator shaft.

Figure 1:
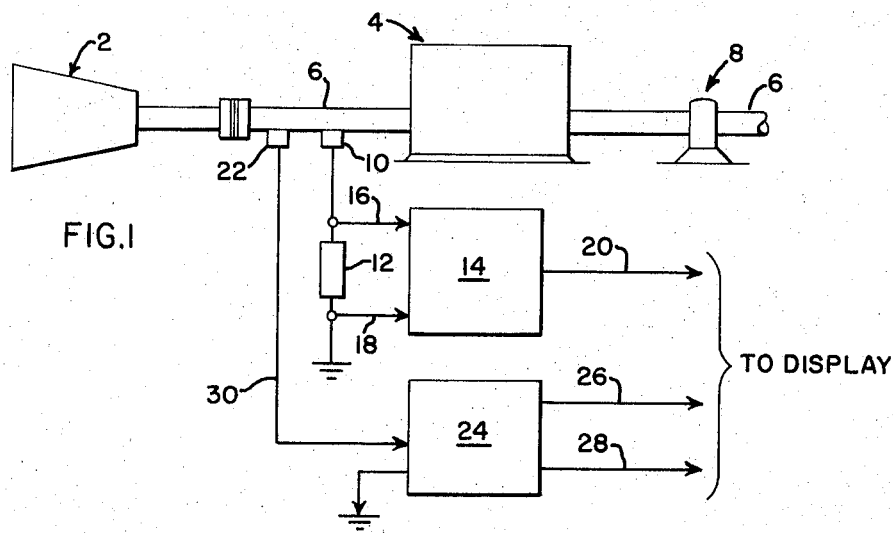
FIG. 1 is a representative view of a turbine generator arrangement showing attachment of the voltage and current monitors of this invention to voltage and current bleed-off contacts.

Referring specifically to the equipment shown in FIG. 1, the turbine generator arrangement comprises a turbine 2 driving a generator 4 by means of a coupled shaft 6. The shaft 6 is supported by bearings, one of which is indicated symbolically at 8. One of the bearings 8 is insulated from ground, by means well known in the art, to open circuit the electromagnetic loop voltage and thereby prevent current flow through the shaft 6 normally caused by said electromagnetic loop voltage. In order to short circuit the voltage which may buildup on shaft 6 from other sources, a contact 10 is placed in rubbing engagement with shaft 6. Contact 10 may comprise, for example, a spring biased brush. Contact 10 is connected to ground through a low impedance shunt 12. A current monitor 14 is connected by lines 16 and 18 into a parallel arrangement with shunt 12 and monitors the current flowing through shunt 12. Electronic circuitry is provided within current monitor 14 to provide an output on line 20 if the current through shunt 12 exceeds a predetermined value.

A second contact 22 also in rubbing engagement with shaft 6 is connected via line 30 to ground through a high impedance voltage monitoring circuit 24. Circuitry within voltage monitoring circuit 24 provides a first output on line 26 whenever the voltage on shaft 6 momentarily exceeds a first predetermined value and provides a second output on line 28 when the voltage on shaft 6 exceeds a second predetermined value for a predetermined sustained period of time. A sustained voltage might appear if current contact 10 built up a non-conducting film and failed to conduct enough current to keep voltage levels on shaft 6 low.

Figure 2:
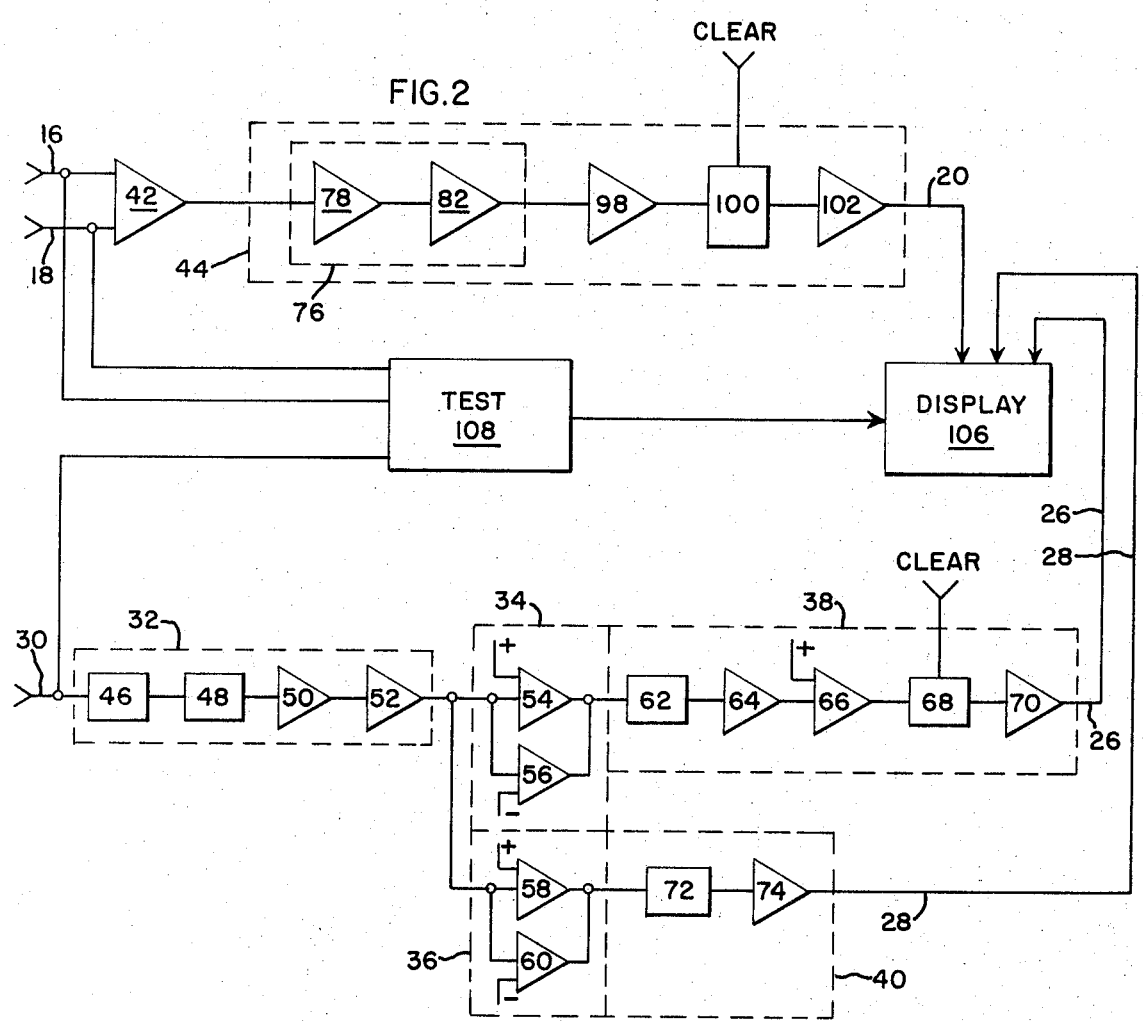
FIG. 2 is a block diagram of the voltage and current monitors of this invention.

FIG. 2 is a simplified block diagram of the voltage and current monitoring circuits shown in FIG. 1. Voltage monitoring circuit 24 comprises a signal processor circuit 32, a pair of dual mode comparator circuits 34 and 36 connected to the output of processor circuit 32 and a voltage alarm circuit 38 and a voltage warning circuit 40 connected respectively to the outputs of dual mode comparators 34 and 36. Signal processor 32 provides linear attenuation of incoming voltage signals and limits the maximum amplitude of voltage signals fed to comparators 34 and 36 to a level necessary to prevent damage to the comparators. Comparators 34 and 36 receive the voltage output signals from processor 32 and are set to provide output signals to either voltage alarm circuit 38 or voltage warning circuit 40 whenever the output voltage from processor 32 exceeds predetermined values. Each of the dual mode comparators 34 and 36 contain identical circuitry; however, comparator 36 is set to trigger and provide an output upon receipt of an input voltage lower than the input voltage required to trigger comparator 34. Voltage alarm circuit 38 is set to trigger and provide an output upon receipt of a sustained voltage input from comparator 34. Voltage warning circuit 40 is set to trigger and provide an output each time a voltage input is received from comparator 36.

Current monitoring circuit 14 comprises a differential input amplifier 42 and a current alarm circuit 44. A voltage developed across shunt 12 is fed into amplifier 42 via input lines 16 and 18. The amplified voltage is then fed from the output of amplifier 42 to current alarm circuit 44. Current alarm circuit 44 is adjusted to provide an output on line 20 when the input from amplifier 42 exceeds a predetermined level.

Referring further to the details of the circuits of FIG. 2, the signal processor 32 will be described. Generator shaft 6 represents a voltage source of up to plus or minus 100 volts from shaft to ground. In order to protect the electronics of the voltage monitor circuit, a passive attenuator 46 is used as a first stage of signal processor 32. Attenuator 46 may comprise, for example, a parallel tuned circuit, tuned to give a flat bandpass from DC to a selected high frequency. This allows high frequency voltage spikes to be passed with the same attenuation as a constant DC voltage. Signal processor 32 also comprises a voltage limiter 48 connected to the output of attenuator 46. Limiter 48 may, for example, be a pair of reversely connected parallel zener diodes. Signal processor 32 further comprises a high impedance voltage follower 50 and an amplifier 52. Voltage follower 50 is connected to receive the attenuated and limited voltage from attenuator 46 and limiter 48 and is used to provide impedance buffering to the monitoring electronics. The gain bandwidth product of voltage follower 50 is made sufficient to insure accurate measurement of high frequency voltage spikes. The output of voltage follower 50 is amplified by amplifier 52 and the output of amplifier 52 is fed to the inputs of dual-mode comparators 34 and 36.

Dual-mode comparators 34 and 36 each comprise two individual comparators 54 and 56 and 58 and 60 respectively. The individual comparators are set up in pairs with each pair having their outputs combined to implement a logic OR arrangement. Comparators 54 and 56 have their voltage reference thresholds set to trigger at a first peak input voltage. Comparators 58 and 60 have their voltage reference thresholds set to trigger at a second peak input voltage. The switching time of these comparators is relatively fast and the arrangement used allows an input signal in excess of the threshold reference voltage, either positively or negatively, to produce an output pulse each time the input signal exceeds either the first or second peak input voltages.

The combined output of comparators 54 and 56 is conducted into alarm circuit 38 where it fires a retriggerable monostable multivibrator 62 having a fixed duration and fixed amplitude output pulse. The output pulses of multivibrator 62 are directed into integrator 64. The voltage at the output of integrator 64 is proportional to the number of input signal pulses from multivibrator 62 while the number of pulses from multivibrator 62 is proportional to the number of input pulses on input line 30 in excess of the first peak input voltage.

Comparator 66 receives the output from integrator 64 and is set to fire when the voltage output of integrator 64 attains an amplitude equivalent to more than N pulses per second fpr P seconds from multivibrator 62, where N and P represent preselected values. The output pulse of comparator 66 fires a NAND latch circuit 68. The output of NAND latch circuit 68 is used to drive a current amplifier 70 which provides an alarm output signal on line 26. An externally produced clear signal is used to reset the NAND latch circuit 68 after removal of the alarm condition.

Similarly, the combined outputs of comparators 58 and 60 fire a retriggerable monostable multivibrator 72. However, the output of multivibrator 72 is used to drive a current amplifer 74 directly to provide a warning output on line 28. The reset time of multivibrator 72 is set such that if more than S pulses per second in amplitude in excess of the second peak input voltage are input to the system, the warning output will be maintained. The number of pulses S can be selected to accommodate the particular system. A single voltage spike of amplitude greater than the second peak input voltage is sufficient to light the warning lamp for one time constant of the multivibrator 72. In this manner, transient spiking can be observed without causing an alarm output on line 26.

The shaft current monitoring circuit 14 operates somewhat differently than the voltage monitoring circuit 16. The voltage across current shunt 12 is proportional to the current through grounding contact 10. Excessive currents are indicative of problems related to bearing insulation failure. The current monitor 14 uses the voltage across the current shunt 12 as its input. To eliminate any common mode problems due to small differences in grounds, a floating, high impedance, high gain, differential amplifier 42 having a common mode rejection of 100 db or greater is used as the first stage of current monitor 14. The output of amplifier 42 is AC coupled to current alarm circuit 44.

Current alarm circuit 44 comprises a full wave rectifier circuit 76 producing a DC output proportional to the current through current shunt 12. Since the voltages across current shunt 12 are relatively small, rectifier circuit 76, although responsive to the amplified output from amplifier 42, may be required to rectify relatively small voltages possibly in the non-linear range of rectifier diodes. Consequently, rectifier circuit 76 may comprise, for example, an operational amplifier 78 laving a feedback path through a diode (not shown) and a second operational amplifier 82 connected to the output of amplifier 78 through a second diode (not shown). Use of an operational amplifier type of rectifier circuit eliminates the discontinuities inherent in the operation of diodes in their non-linear region. Amplifier 82 includes a gain adjust used to set the alarm threshold level from the current monitor circuit 14.

The adjusted output of amplifier 82 is directed into voltage comparator 98 producing an output from comparator 98 when the output of amplifier 82 exceeds the alarm threshold level determined by the bias voltage at comparator 98. The output of comparator 98 sets a NAND latch circuit 100 whose output is used to drive a current amplifier 102 which provides a current alarm output signal on line 20. An externally generated clear signal is used to reset NAND latch 100 to its original state after removal of the alarm condition.

The output signals from both current monitor 14 and voltage monitor 24 may be used to drive an alarm and warning device 106. Device 106 may, for example, comprise a system of relay actuated lights or a system of relay driven klaxons for alerting personnel of undesirable conditions. Alternately, device 106 may be provided with means for automatically shutting down the operating equipment in response to an alarm or warning signal.

Reliability of current monitor 14 and voltage monitor 24 may be verified by use of a system integrity test circuit 108 as shown in FIG. 2. Alternatively, manual point to point testing or other means well known in the art may be used. Test circuit 108 may comprise circuitry well known in the art for providing input signals to both current monitor 14 and voltage monitor 24 to simulate various conditions of voltage and current on shaft 6. Test circuit 108 may also provide an input signal to alarm and warning device 106 to assure that device 106 is responsive to output signals from current monitor 14 and voltage monitor 24 indicative of an undesirable condition. Programmable means, not shown, may be incorporated into test circuit 108 to provide for automatic periodic testing of the monitoring system.

The invention has been described in connection with a turbine generator system where it has particular applicability and its operation has been set forth with relation to such use. It will be understood, however, that the voltage and current monitor arrangement may be used in other environments where it is necessary to monitor voltage and current levels on a concurrent basis and provide a signal indicative of an undesirable amplitude of either voltage or current. It is intended, therefore, that the appended claims not be limited to the specific embodiment of the invention described but that they cover modifications falling within the spirit and scope of the claims.

What is claimed as new and desired to be secured by Letters Patent of the United States is:

1. Apparatus for monitoring voltage on a rotating shaft comprising:
   a first contact positioned against said shaft, said first contact being connected to an electrical ground through a low impedance shunt;
   a second contact positioned against said shaft, said second contact being connected to an electrical ground through a high impedance voltage monitoring circuit, said voltage monitoring circuit connected to receive an input voltage from said second contact and to produce a first output signal when said input voltage exceeds a first predetermined level and to produce a second output signal when said input voltage exceeds a second predetermined level for a predetermined sustained period of time.

2. The apparatus for monitoring voltage as defined in claim 1 and including a current monitoring circuit having dual differential input terminals connected across said low impedance shunt for producing a current responsive output signal when current through said shunt exceeds a predetermined level.

3. The apparatus for monitoring voltage as defined in claim 2 and including an alarm and warning display system connected to receive and be responsive to said first and second output signals and to said current responsive output signal for producing alerting signals indicative of an input voltage or an input current exceeding said predetermined levels.

4. The apparatus for monitoring voltage as defined in claim 3, and wherein there is provided a system integrity test circuit for producing signals simulating input voltages and an input current in excess of said predetermined levels and connected for selectively injecting said signals corresponding to said excessive voltages and current into said apparatus to thereby test the response to said apparatus to said excessive voltages and current.

5. The apparatus for monigoring voltage as defined in claim 1, and wherein said high impedance voltage monitoring circuit comprises:
   a signal processor having an input terminal connected to said second contact, said signal processor comprising:
      a. an attenuator circuit for attenuating an input voltage applied to said voltage monitoring circuit, and
      b. a voltage limiter circuit for limiting the voltage output of said attenuator to a predetermined level;
   first and second dual-mode comparators connected to receive an input from said signal processor, said first comparator providing a warning output signal upon receipt of an input from said signal processor in response to said input voltage exceeding said first predetermined level; said second comparator providing an alarm output signal upon receipt of an input from said signal processor in response to said input voltage exceeding said second predetermined level for said predetermined sustained period of time;
   a voltage warning circuit connected to receive said warning output signal from said first comparator and to provide said first output signal in response to said warning output signal; and,
   a voltage alarm circuit connected to receive said alarm output signal from said second comparator and to provide said second output signal in response to said alarm output signal.

6. The apparatus as defined in claim 5 in which said attenuator circuit includes a parallel tuned linear attenuator for providing linear attenuation of said input voltage.

7. The apparatus as defined in claim 5 in which said voltage alarm circuit comprises:
   a retriggerable monostable multivibrator, said multivibrator producing a fixed amplitude, fixed duration output pulse in response to said alarm output signal from said second dual-mode comparator;
   an integrator, said integrator connected to receive said output pulse from said multivibrator and to produce an output signal having an amplitude proportional to the rate of output pulses received from said multivibrator;

a voltage comparator, said voltage comparator connected to receive said output signal from said integrator and to produce an output trigger pulse when said output signal from said integrator reaches a predetermined amplitude; and A NAND latch circuit, said NAND latch circuit connected to receive said output trigger pulse from said comparator and to produce a continuous fixed amplitude voltage alarm signal in response to said output trigger pulse.

8. The apparatus as defined in claim 5 in which said voltage warning circuit comprises:

a retriggerable monostable multivibrator, said multivibrator producing a fixed amplitude, fixed duration output pulse in response to said warning output signal from said first dual-mode comparator;

an amplifier, said amplifier connected to receive said output pulse from said multivibrator and to produce a warning output signal upon receipt of each of said multivibrator output pulses.

9. The apparatus for monitoring voltage as defined in claim 2, and wherein said current monitoring circuit comprises:

a differential input amplifier connected to said dual differential input terminals for providing a current alarm output signal in response to said first input current level; and a current alarm circuit connected to receive said current alarm output signal from said differential input amplifier and to provide said current responsive output signal in response to said current alarm output signal.

10. The apparatus as defined in claim 9 in which said current alarm circuit comprises:

a rectifier connected to receive said current alarm output signal and to produce a DC voltage proportional to the peak amplitude of said current alarm output signal;

a comparator connected to receive said DC voltage and to produce an output pulse when said DC voltage exceeds a predetermined level; and a NAND latch circuit connected to receive said output pulse from said comparator and to produce said current responsive output signal in response to said output pulse.

* * * * *